United States Patent [19]

Eichenauer et al.

[11] Patent Number: 5,804,656
[45] Date of Patent: Sep. 8, 1998

[54] COMPOSITIONS OF THE ABS TYPE FOR PROCESSING BY EXTRUSION AND DEEP DRAWING

[75] Inventors: Herbert Eichenauer, Dormagen; Peter Krüger, Leverkusen; Harry Staratschek, Köln; Edgar Leitz, Dormagen; Dieter Wittman, Leverkusen, all of Germany; Karl-Erwin Piejko, Longmeadow, Mass.; Jürgen Ramthun, Bergisch Gladbach, Germany

[73] Assignee: Bayer Aktiengesellschaft, Germany

[21] Appl. No.: 778,845

[22] Filed: Jan. 6, 1997

[30] Foreign Application Priority Data

Jan. 12, 1996 [DE] Germany .................. 196 00 902.2

[51] Int. Cl.⁶ ................................................ C08L 9/00
[52] U.S. Cl. .................................................. 525/86
[58] Field of Search .................................... 525/86

[56] References Cited

U.S. PATENT DOCUMENTS

| 4,985,496 | 1/1991 | Kishida et al. | 525/86 |
| 5,283,286 | 2/1994 | Takahashi et al. | 525/86 |
| 5,302,663 | 4/1994 | Eichenauer et al. | 525/86 |

FOREIGN PATENT DOCUMENTS

| 0 042 572 | 12/1981 | European Pat. Off. | 525/86 |
| 0 439 883 | 8/1991 | European Pat. Off. | 525/86 |
| 1 036 744 | 4/1969 | United Kingdom . | |

OTHER PUBLICATIONS

Database WPI, Section Ch. Week 7947, Derwent Publications Ltd., London, GB; & JP 54 133 588 A (Japan Synthetic Rubber Co. Ltd), Oct. 17, 1979.
JA 7123145 (abstract).
Ullmann's Encyclopedia of Industrial Chemistry, 5$^{th}$ Edition, vol. A 21, pp. 652–653, VCH, Weinheim, 1992.

*Primary Examiner*—Melvyn I. Marquis
*Attorney, Agent, or Firm*—Connolly & Hutz

[57] ABSTRACT

Compositions of the ABS type containing

A) one or more graft rubbers of
   A.1) from 10 to 60 parts by weight of one or more monomers on
   A.2) from 40 to 90 parts by weight of one or more rubber backbones having glass transition temperatures <0°C. and
B) at least one rubber-free thermoplastic resin obtained by radical polymerisation of resin-forming monomers, wherein the rubber backbone A.2) has average particle diameters ($d_{50}$ values) of from 0.20 to 0.35 μm and the graft rubber A) has been produced by radical emulsion graft polymerisation with the use of an initiator system comprising organic hydroperoxide and an organic reducing agent, and the use thereof for the production of mouldings by deep drawing.

10 Claims, No Drawings

COMPOSITIONS OF THE ABS TYPE FOR PROCESSING BY EXTRUSION AND DEEP DRAWING

ABS polymers have been used for many years as industrial plastics for the production of moulded articles of all kinds (see, for example, Ullmann's Encyclopedia of Industrial Chemistry, 5th Edition, Vol. A 21, pages 652–653, VCH, Weinheim, 1992), with injection moulding or extrusion being the processing methods particularly employed.

Deep drawing of extruded sheets has proved to be a successful method for the production of special parts; suitable ABS materials for this are described, for example, in JP 71 023 145.

However, these materials have a relatively complicated structure, do not simultaneously exhibit adequate elasticity on melting and a satisfactory toughness at a low rubber content and do not produce deep-drawn parts having a good surface quality.

There have now been found ABS polymers which are particularly suitable for processing by extrusion and deep drawing and do not have the above-mentioned disadvantages. These ABS polymers contain as a toughening component at least one special graft rubber.

The invention provides ABS compositions having improved deep-drawing behaviour, containing A) one or more graft rubbers of
    A.1) from 10 to 60 parts by weight, preferably from 20 to 50 parts by weight, of one or more monomers on
    A.2) from 40 to 90 parts by weight, preferably from 50 to 80 parts by weight, of one or more rubber backbones having glass transition temperatures <0° C., preferably <−20° C., and B) at least one rubber-free thermoplastic resin obtained by radical polymerisation of resin-forming monomers, wherein the rubber backbone A.2) has average particle diameters ($d_{50}$ values) of from 0.20 to 0.35 µm, preferably from 0.25 to 30 µm, and the graft rubber A) has been produced by radical emulsion graft polymerisation with the use of an initiator system comprising organic hydroperoxide and an organic reducing agent, preferably ascorbic acid and/or a salt of ascorbic acid.

Particularly preferred composites according to the invention are those containing from 10 to 60 parts by weight, preferably from 20 to 50 parts by weight of A), and from 40 to 90 parts by weight, preferably from 50 to 80 parts by weight, of B).

Graft rubbers according to the invention are the products formed by the graft polymerisation of monomers A.1) in the presence of rubber A.2).

Monomers A.1) are preferably mixtures of
    A.1.1) from 50 to 99 parts by weight of vinyl aromatics and/or vinyl aromatics substituted in the ring (such as, for example, styrene, α-methylstyrene, p-methylstyrene, p-chlorostyrene) and/or methacrylic ($C_1$–$C_4$) alkyl esters (such as, for example, methyl methacrylate, ethyl methacrylate) and
    A.1.2) from 1 to 50 parts by weight of vinyl cyanides (unsaturated nitrites such as acrylonitrile and methacrylonitrile) and/or (meth)acrylic $C_1$–$C_8$) alkyl esters (such as, for example, methyl methacrylate, n-butyl acrylate, t-butyl acrylate) and/or unsaturated carboxylic acids (such as maleic acid) and/or derivatives (such as anhydrides and imides) of unsaturated carboxylic acids (for example, maleic anhydride and N-phenylmaleimide).

Preferred monomers A.1.1) are styrene, α-methylstyrene and methyl methacrylate; preferred monomers A.1.2) are acrylonitrile, maleic anhydride, N-phenylmaleimide and methyl methacrylate.

Particularly preferred monomers are styrene as A.1.1) and acrylonitrile as A.1.2).

Rubber backbones A.2) suitable for the graft polymer A) are, for example, diene rubbers, EPM and EPDM rubbers, that is, those consisting of ethylene/propylene and optionally small quantities of a nonconjugated diene (such as norbornene, norbornadiene), acrylic, polyurethane, silicone, chloroprene and ethylene/vinyl acetate rubbers, provided that these rubbers are in the form of an emulsion.

Preferred rubber backbones A.2) are diene rubbers (for example, based on butadiene, isoprene, et cetera) or mixtures of diene rubbers or copolymers of diene rubbers or mixtures thereof with other copolymerisable monomers (for example, A.1.1) and A.1.2)), on condition that their glass transition temperatures are below 0° C.

Pure polybutadiene rubber is particularly preferred.

Other particularly preferred rubber backbones A.2) are acrylic rubbers, preferably polymers of acrylic alkyl esters, optionally containing up to 40 wt. % (referred to A.2) of other polymerisable ethylenically unsaturated monomers. The preferred polymerisable acrylic esters include $C_1$–$C_8$) alkyl esters, for example, methyl, ethyl, butyl, n-octyl and 2-ethylhexyl esters; haloalkyl esters, preferably halo-$C_1$–$C_8$) alkyl esters, such as chloroethyl acrylate, as well as mixtures of these monomers.

Monomers having more than one polymerisable double bond can be copolymerised to achieve cross-linking. Preferred examples of cross-linking monomers are esters of unsaturated monocarboxylic acids having 3 to 8 C atoms and unsaturated monohydric alcohols having 3 to 12 C atoms or saturated polyols having 2 to 4 OH groups and 2 to 20 C atoms such as, for example, ethylene glycol dimethacrylate, allyl methacrylate; polyunsaturated heterocyclic compounds such as, for example, trivinyl and triallyl cyanurate; polyfunctional vinyl compounds, such as divinylbenzene and trivinylbenzene, and also triallyl phosphate and diallyl phthalate.

Preferred cross-linking monomers are allyl methacrylate, ethylene glycol dimethacrylate, diallyl phthalate and heterocyclic compounds having at least three ethylenically unsaturated groups.

Particularly preferred cross-linking monomers are the cyclic monomers triallyl cyanurate, triallyl isocyanurate, trivinyl cyanurate, trisacryloylhexahydro-s-triazine, triallylbenzenes. The quantity of cross-linking monomers is preferably from 0.02 to 5 wt. %, in particular 0.05 to 2 wt. %, referred to the graft backbone A.2).

In the case of cyclic cross-linking monomers having at least three ethylenically unsaturated groups it is advantageous to restrict the quantity to less than 1 wt. % of the graft backbone A.2).

Examples of preferred "other" polymerisable ethylenically unsaturated monomers, which besides the acrylic esters may optionally be used for the production of the graft backbone A.2), are acrylonitrile, styrene, α-methylstyrene, acrylamides, vinyl $C_1$–$C_6$) alkyl ethers, methyl methacrylate, butadiene. Preferred acrylic rubbers for use as graft backbone A.2) are emulsion polymers having a gel content of at least 50 wt %.

Further suitable graft backbones appropriate for A.2) are silicone rubbers having active grafting positions, which are described in DE-OS 3 704 657, DE-OS 3 704 655, DE-OS 3 631 540 and DE-OS 3 361 539.

The gel content of the graft backbone A.2) is from 30 to 80 wt. %, preferably from 40 to 70 wt. % and particularly preferably from 45 to 60 wt. % (measured in toluene by means of the wire-cage method, cf. Houben-Weyl, Methoden der Organischen Chemie, Makromolekulare Stoffe, Part 1, page 307 (1961), Thieme Verlag, Stuttgart); the average particle diameter $d_{50}$ of the rubber backbone A.2) is from 0.20 to 0.35 μm, preferably from 0.25 to 0.30 μm.

The average particle size $d_{50}$ is the diameter above and below which 50 wt. % respectively of the particles lie. It can be determined by means of ultracentrifugation measurements (W. Scholtan, H. Lange, Kolloid, Z. and Z. Polymere 250, (1972), pages 782 to 796).

The graft rubbers A) are preferably produced by radical emulsion polymerisation.

The compounds conventionally used as molecular weight controllers such as, for example, mercaptans or dimeric α-methylstyrene, can be used in the production of graft rubbers A).

Virtually all types of emulsifiers (anionic, cationic and nonionic emulsifiers) are suitable emulsifiers; preferably anionic emulsifiers are used.

Examples of suitable anionic emulsifiers are sodium salts, potassium salts or ammonium salts of long-chain fatty acids having 10 to 20 carbon atoms, for example, potassium oleate, salts of disproportionated abietic acid, salts of long-chain benzenesulphonates, salts of long-chain sulphonic acids, for example, the sodium salts of ($C_9$–$C_{18}$) alkylsulphonic acid mixtures and salts of dicarboxylic acids based on cyclic hydrocarbon skeletons, as in DE-OS 3 639 904 and DE-OS 3 913 509.

The reaction temperatures chosen can be any temperatures whereat the initiator compounds used yield radicals to a degree adequate for initiating and maintaining the polymerisation reaction. This temperature range is between about 30° C. and 120° C., preferably between 45° C. and 100° C. and particularly preferably between 50° C. and 70° C.

Particularly suitable graft rubbers are ABS polymers produced by redox-initiation using an initiator system consisting of organic hydroperoxide and an organic reducing agent.

Examples of organic peroxides are di-tert. butyl peroxide, cumene hydroperoxide, dicyclohexyl percarbonate, tert. butyl hydroperoxide, p-menthane hydroperoxide; cumene hydroperoxide and tert. butyl hydroperoxide are preferred. Examples of organic reducing agents are ascorbic acid or its salts and sugar derivatives such as, for example, glucose, dextrose. The preferred organic reducing agent is ascorbic acid and/or a salt of ascorbic acid.

The invention also provides the use of graft rubbers A), obtained by redox-initiated emulsion polymerisation with the use of an organic hydroperoxide, preferably cumene hydroperoxide or tert. butyl hydroperoxide, and of an organic reducing agent, preferably ascorbic acid and/or a salt of ascorbic acid, and with the use of a rubber backbone, preferably polybutadiene, having an average particle diameter ($d_{50}$ value) of from 0.20 to 0.35 μm, preferably from 0.25 to 0.30 μm, and a gel content of from 30 to 80 wt. %, preferably from 40 to 70 wt % and particularly preferably from 45 to 60 wt. %, for the production of compositions of the ABS type for processing by extrusion and deep drawing.

The moulding compositions according to the invention contain from 10 to 60 parts by weight of A) and from 40 to 90 parts by weight of B), preferably from 20 to 50 parts by weight of A) and from 50 to 80 parts by weight of B).

At less than 10 parts by weight of A) the impact strength of the compositions is not sufficiently modified, whereas at more than 60 parts by weight of A) the rigidity of the compositions is lost.

The rubber-free thermoplastic resin B) comprises one or more polymers obtained by radical polymerisation of resin-forming monomers.

Particularly suitable are polymers B) of one or more monomers from the group comprising vinyl aromatics, vinyl cyanides (unsaturated nitriles), acrylic ($C_1$–$C_8$) alkyl esters, methacrylic ($C_1$–$C_8$) alkyl esters, unsaturated carboxylic acids including the derivatives thereof (such as anhydrides and imides). Especially suitable are copolymers consisting of B.1) from 50 to 99 parts by weight of vinyl aromatics and/or vinyl aromatics substituted in the ring (such as, for example, styrene, α-methylstyrene, p-methylstyrene, p-chlorostyrene) and/or methacrylic $C_1$–$C_4$) alkyl esters (such as, for example, methyl methacrylate, ethyl methacrylate) and B.1) from 1 to 50 parts by weight of vinyl cyanides (unsaturated nitriles such as acrylonitrile and methacrylonitrile) and/or (meth)acrylic $C_1$–$C_8$) alkyl esters (such as, for example, methyl methacrylate, n-butyl acrylate, t-butyl acrylate) and/or unsaturated carboxylic acids (such as maleic acid) and/or derivatives (such as anhydrides and imides) of unsaturated carboxylic acids (for example, maleic anhydride and N-phenylmaleimide).

The polymers B) are resinous, thermoplastic and free of rubber.

The copolymer of B.1) styrene and B.2) acrylonitrile is particularly preferred.

The polymers B) are known and can be prepared by radical polymerisation, in particular by emulsion, suspension, solution or bulk polymerisation. The polymers B) preferably have average molecular weights $\overline{M}_w$ (weight average determined by light scattering or sedimentation) of 15,000 to 300,000, preferably of 40,000 to 250,000 and particularly preferably of 50,000 to 200,000.

The weight ratio A:B is 2:1 to 1:4 (preferably 1:1 to 1:2). Higher ratios of A:B lead to inadequate flow properties and decreased rigidity, whereas lower ratios of A:B give rise to an unsatisfactory toughness at low temperatures.

The compositions according to the invention may contain other known additives in the conventional or required quantities. Here one may mention stabilisers (for example, sterically hindered phenols and thioethers or phosphite compounds as synergists), conventional pigments (carbon black, metal oxides, et cetera), mould release agents (for example, pentaerythritol tetrastearate), flow-control agents (ethylenediamine bisstearylamide), fillers and reinforcing agents (for example, glass fibres and carbon fibres), flame-proofing agents (for example, tetrabromobisphenol A), anti-drip agents (for example, tetrafluoroethylene polymers) and antistatic agents (for example, polyalkylene ethers). This list does not claim to be comprehensive.

The compositions according to the invention can be produced by mixing the components together in a conventional manner and melt-compounding or melt-extruding them at elevated temperatures, preferably at 200° to 260° C., in conventional devices such as closed kneaders, extruders or double-shaft screw-type devices. The compositions according to the invention are particularly suitable for the production of moulded articles by extrusion (for example, sheets and films) and subsequent deep drawing.

The invention also provides the use of the compositions described for the production of mouldings by extrusion and by deep drawing.

EXAMPLES

1. Components

A.I. Graft rubber produced by emulsion polymerisation of a mixture of 40 parts by weight of a styrene/acrylonitrile mixture (weight ratio 73:27) in the presence of 60 parts by weight (solid) of a polybutadiene latex produced by a conventional method (average particle diameter $d_{50}$=280 nm, gel content =45 wt. %), using a redox initiator system comprising cumene hydroperoxide and ascorbic acid (production similar to Example B.1 of DE-OS 3 738 143).

A.II. (Comparison)

Graft rubber produced by emulsion polymerisation, using potassium persulphate as initiator, of a mixture of 40 parts by weight of a styrene/acrylonitrile mixture (weight ratio 73:27) in the presence of 60 parts by weight (solid) of a polybutadiene latex produced by a conventional method (average particle diameter $d_{50}$=280 nm, gel content =45 wt. %).

A.III. (Comparison)

Graft rubber produced as in A.II, using a polybutadiene latex having an average particle diameter $d_{50}$=408 nm.

A.IV. (Comparison)

Graft rubber produced as in A.I, using a polybutadiene latex having an average particle diameter $d_{50}$=408 nm.

A.V. (Comparison)

Graft rubber produced as in A.I, using a polybutadiene latex having an average particle diameter $d_{50}$=283 nm and a gel content of 91%.

A.VI (Comparison)

Graft rubber produced as in A.II, using a polybutadiene latex having an average particle diameter $d_{50}$=128 nm.

A.VII. (Comparison)

Graft rubber produced as in A.I, using a polybutadiene latex having an average particle diameter $d_{50}$=128 nm.

B. Styrene/acrylonitrile copolymer having a styrene/acrylonitrile weight ratio of 72:28, an average molecular weight $\overline{M}_w$ of 115,000 and a molecular inhomogeneity $U = \overline{M}_w/\overline{M}_n - 1 \leq 2$.

2. Production and Testing of the Compositions According to the Invention and of the Comparative Compositions A) and B) in the quantities given in Table 1, together with additives (2 parts by weight of pentaerythritol tetrastearate and 0.1 parts by weight of silicone oil, each per 100 parts by weight of A+B), were melted at 180° to 230° C. in a closed kneader, homogenised and granulated. Sheets were produced from the granules.

As a high elasticity on melting (corresponding to a low loss factor tan δ) is necessary for a good deep-drawing performance in ABS compositions, the deep-drawing behaviour can be established by determining the loss factor tan δ at low frequencies (corresponding to a low shear rate occurring during the deep drawing) at a temperature of 170° C. (Equipment: RDA II from the firm Rheometrics, sheet/sheet arrangement).

In addition extruded sheets (30 cm×26 cm) were deep drawn from several products to form a paraboloid and the deep-drawing performance and the condition of the surface were assessed. The mechanical properties were assessed by the behaviour on impact.

As is apparent from Table 2, at low frequencies (ω=0.02 rad/sec) only the compositions according to the invention exhibit the low loss factor tan δ required for a good deep drawing performance. The good deep drawing performance of the compositions according to the invention having a low rubber content (Example 1, tan δ=1.6) is particularly remarkable; such a good deep drawing capacity is otherwise approximately achieved only at far higher rubber contents (see, for example, Examples 12 and 13, tan δ=1.3 and 1.9 respectively) with the inevitable acceptance of distinct disadvantages (for example, poor surface).

The deep drawing capacity and the surface of the deep-drawn parts were evaluated as follows:

++ very good
+ good
o average
– poor
– – very poor

TABLE 1

Formulations of the compositions

| Example | A.I [Parts by wt.] | A.II [Parts by wt.] | A.III [Parts by wt.] | A.IV [Parts by wt.] | A.V [Parts by wt.] | A.VI [Parts by wt.] | A.VII [Parts by wt.] | B [Parts by wt.] |
|---|---|---|---|---|---|---|---|---|
| 1 | 25 | — | — | — | — | — | — | 75 |
| 2 (Comparison) | — | 25 | — | — | — | — | — | 75 |
| 3 (Comparison) | — | — | 25 | — | — | — | — | 75 |
| 4 | 33.3 | — | — | — | — | — | — | 66.7 |
| 5 (Comparison) | — | 33.3 | — | — | — | — | — | 66.7 |
| 6 (Comparison) | — | — | 33.3 | — | — | — | — | 66.7 |
| 7 (Comparison) | — | — | — | 33.3 | — | — | — | 66.7 |
| 8 (Comparison) | — | — | — | — | 33.3 | — | — | 66.7 |
| 9 (Comparison) | — | — | — | — | — | 33.3 | — | 66.7 |
| 10 (Comparison) | — | — | — | — | — | — | 33.3 | 66.7 |
| 11 | 41.7 | — | — | — | — | — | — | 58.3 |
| 12 (Comparison) | — | 41.7 | — | — | — | — | — | 58.3 |
| 13 (Comparison) | — | — | 41.7 | — | — | — | — | 58.3 |

TABLE 2

Assessment of the compositions

| Example | Tan δ at ω = 0.02 rad/sec | Behaviour on deep drawing | Surface quality of the deep-drawn part | Behaviour on impact |
|---|---|---|---|---|
| 1 | 1.6 | ++ | ++ | tough |
| 2 (Comparison) | 2.4 | 0 | — | tough |
| 3 (Comparison) | 2.8 | — | n.m. | tough |
| 4 | 1.2 | ++ | ++ | tough |
| 5 (Comparison) | 2.0 | 0 | — | tough |
| 6 (Comparison) | 2.5 | — | n.m. | tough |
| 7 (Comparison) | 1.5 | 0 | — | tough |
| 8 (Comparison) | 2.4 | — | n.m. | brittle |
| 9 (Comparison) | 2.0 | — | n.m. | brittle |

TABLE 2-continued

Assessment of the compositions

| Example | Tan δ at ω = 0.02 rad/sec | Behaviour on deep drawing | Surface quality of the deep-drawn part | Behaviour on impact |
|---|---|---|---|---|
| 10 (Comparison) | 1.3 | — | n.m. | brittle |
| 11 | 0.9 | ++ | + | tough |
| 12 (Comparison) | 1.3 | ++ | 0 | tough |
| 13 (Comparison) | 1.9 | + | — | tough | n.m. = not measured

We claim:

1. Compositions containing
   A) one or more graft rubbers of
      A.1) from 10 to 60 parts by weight of one or more monomers and
      A.2) from 40 to 90 parts by weight of one or more rubber backbones having glass transition temperatures <0° C. and
   B) at least one rubber-free thermoplastic resin obtained by radical polymerisation of resin-forming monomers of
      B.1) from 50 to 99 parts by weight selected from the group consisting of vinyl aromatics, vinyl aromatics substituted in the ring, and methacrylic ($C_1$–$C_4$) alkyl esters, and
      B.2) from 1 to 50 parts by weight selected from the group consisting of vinyl cyanides and (meth)acrylic ($C_1$–$C_8$) alkyl esters
   wherein the rubber backbone A.2) has average particle diameters ($d_{50}$ values of from 0.20 to 0.35 μm and the graft rubber A) has been produced by radical emulsion graft polymerisation with the use of an initiator system comprising organic hydroperoxide and an organic reducing agent.

2. Compositions according to claim 1, containing from 20 to 50 parts by weight of A.1, from 50 to 80 parts by weight of A.2, with A.2) having average particle diameters ($d_{50}$ values) of from 0.25 to 0.30 μm.

3. Compositions according to claim 1, containing from 10 to 60 parts by weight of A) and from 40 to 90 parts by weight of B).

4. Compositions according to claim 1, wherein the gel content of the rubber backbone A.2) is from 45 to 60 wt. %.

5. Compositions according to claim 1, wherein A.1) is a mixture of styrene and acrylonitrile.

6. Compositions according to claim 1, wherein A.2) is polybutadiene.

7. Compositions according to claim 1, wherein B) is a copolymer of styrene and acrylonitrile.

8. Mouldings obtained from the compositions according to claim 1 by means of deep drawing.

9. Compositions according to claim 1 wherein the one or more monomers of A.1) comprise
   A.1.1) from 50 to 99 parts by weight selected from the group consisting of vinyl aromatics and vinyl aromatics substituted in the ring, and
   A.1.2) from 1 to 50 parts by weight of vinyl cyanides.

10. Compositions according to claim 1 wherein the rubber backbone is selected from the group consisting of diene rubbers, mixtures of diene rubbers, copolymers of diene rubbers and mixtures of copolymers of diene rubbers with other copolymerisable monomers selected from the group consisting of
   A.1.1) from 50 to 99 parts by weight selected from the group consisting of vinyl aromatics and vinyl aromatics substituted in the ring, and
   A.1.2) from 1 to 50 parts by weight of vinyl cyanides.

* * * * *